(12) United States Patent
Betzler

(10) Patent No.: US 10,895,304 B2
(45) Date of Patent: Jan. 19, 2021

(54) COMPONENT FOR LIFTING, LASHING OR STOP TECHNOLOGY, PARTICULARLY SHACKLES FOR OUTDOOR OR OFFSHORE APPLICATIONS

(71) Applicant: RUD Ketten Rieger & Dietz GmbH u. Co. KG, Aalen (DE)

(72) Inventor: Michael Betzler, Abtsgmund (DE)

(73) Assignee: Rud Ketten Rieger & Dietz GmbH u. Co. KG, Aalen (DE)

( * ) Notice: Subject to any disclaimer, the term of this patent is extended or adjusted under 35 U.S.C. 154(b) by 241 days.

(21) Appl. No.: 15/763,629

(22) PCT Filed: Sep. 29, 2016

(86) PCT No.: PCT/EP2016/073320
§ 371 (c)(1),
(2) Date: Mar. 27, 2018

(87) PCT Pub. No.: WO2017/055486
PCT Pub. Date: Apr. 6, 2017

(65) Prior Publication Data
US 2018/0274631 A1     Sep. 27, 2018

(30) Foreign Application Priority Data
Sep. 29, 2015   (DE) ................. 10 2015 218 801

(51) Int. Cl.
*F16G 15/06*   (2006.01)
*F16G 15/04*   (2006.01)

(52) U.S. Cl.
CPC ............. *F16G 15/06* (2013.01); *F16G 15/04* (2013.01)

(58) Field of Classification Search
CPC .................................. F16G 15/04; F16G 15/06
See application file for complete search history.

(56) References Cited

U.S. PATENT DOCUMENTS

| 2,097,465 A | 11/1937 | Morrison |
| 4,068,960 A * | 1/1978 | Swager ................. F16G 15/06 59/86 |

(Continued)

FOREIGN PATENT DOCUMENTS

| CN | 102418773 | 4/2012 |
| DE | 2808800 | 9/1978 |

(Continued)

OTHER PUBLICATIONS

Search report issued in related PCT/EP2016/073320, dated Jan. 9, 2017.

(Continued)

*Primary Examiner* — Pradeep C Battula
(74) *Attorney, Agent, or Firm* — Barnes & Thornburg LLP; Jeffrey R. Stone

(57) ABSTRACT

The present invention relates to a component for lifting, lashing or stop technology, in particular a shackle, for outdoor or offshore applications. Thus, a component for lifting, lashing or stop technology is provided and comprises a main body having an opening and at least one closable passage that further comprises a closing element by means of which the passage is closed at a closing position. A closure through which the closing element is held at the closing position is provided such that it is rotatable relative to the main body and secured against opening of the passage, and a closure lock is provided, which is automatically activated at the closing position and through which the closure is blocked at the closing position, said closure lock comprising a grip element used for releasing the closure lock and configured for operation by hand without the use of a tool.

18 Claims, 15 Drawing Sheets

(56) References Cited

U.S. PATENT DOCUMENTS

| | | | |
|---|---|---|---|
| 5,046,881 A | 9/1991 | Swager | |
| 5,433,547 A | 7/1995 | Hart et al. | |
| 7,540,140 B1 | 6/2009 | Diaz et al. | |
| 8,677,727 B2 * | 3/2014 | Robins | F16G 15/06 59/86 |
| 9,903,440 B2 * | 2/2018 | Ohman, III | F16G 15/06 |
| 2005/0276658 A1 | 12/2005 | Silva | |

FOREIGN PATENT DOCUMENTS

| | | |
|---|---|---|
| GB | 281556 | 12/1927 |
| GB | 2221277 | 1/1990 |

OTHER PUBLICATIONS

Chinese Office Action, dated Apr. 4, 2019, in Chinese Application No. 201680056949.0 and its English translation.
Office Action issued in related Australian patent application No. 2016329338, dated Nov. 13, 2018.
Second Office Action, dated Oct. 8, 2019, in Chinese Application No. 201680056949.0 and its English translation.
Office Action dated May 12, 2020, issued in Chinese Application No. 201680056949.0 and its English translation.

\* cited by examiner

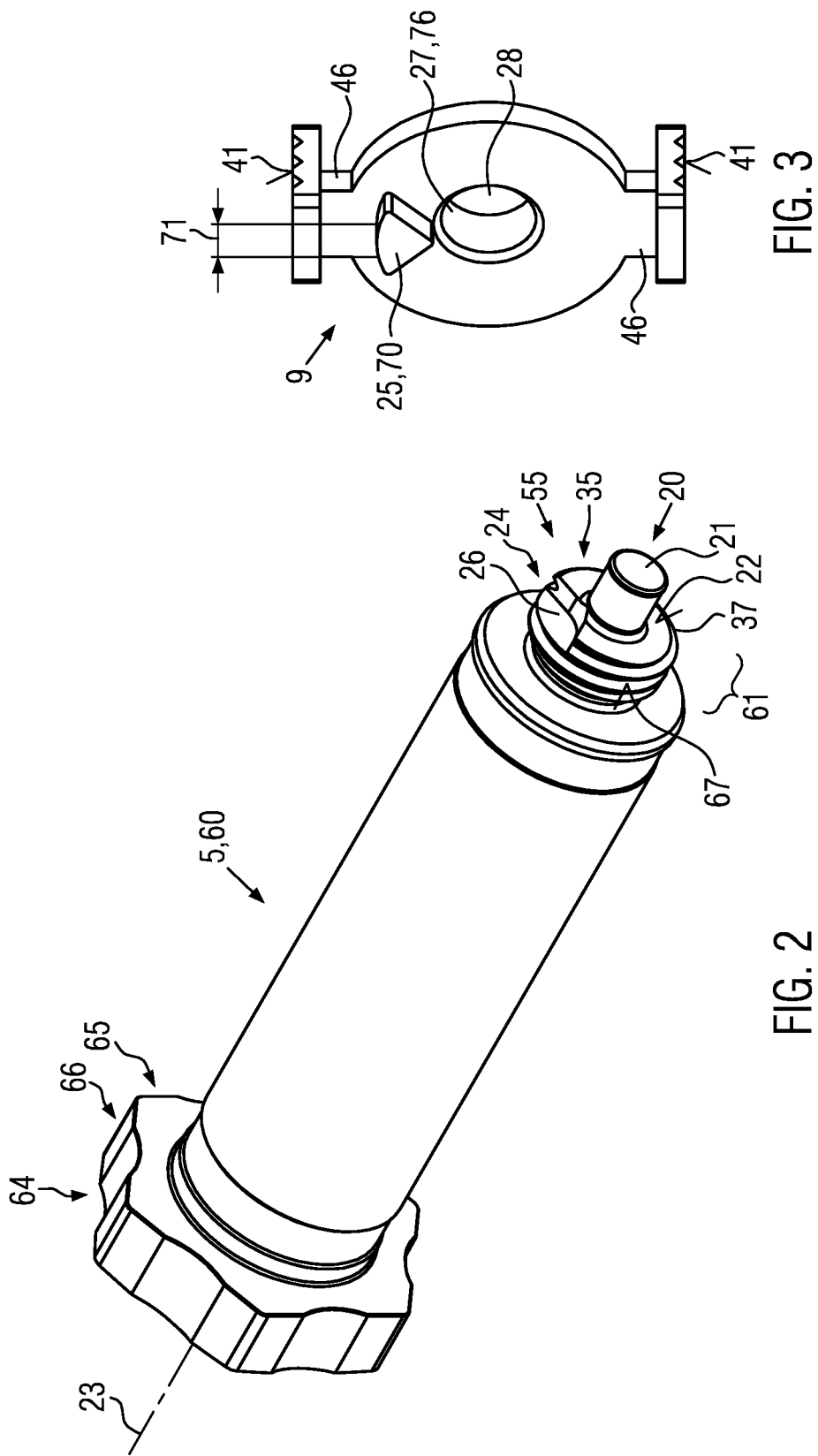

COMPONENT FOR LIFTING, LASHING OR STOP TECHNOLOGY, PARTICULARLY SHACKLES FOR OUTDOOR OR OFFSHORE APPLICATIONS

The invention relates to a component for lifting, lashing or stop technology, in particular in the form of a shackle, for outdoor or offshore applications.

Outdoor and offshore applications include e.g. the use on ships, under water, in port facilities, in military operations, in the mountains or in rescue work. The components used here must, in some cases, be able to take up substantial loads and they must also allow easy handling under adverse environmental conditions.

The present invention satisfies these requirements in that the component referred to at the beginning comprises an opening defined by a main body and having at least one closable passage, and further comprises a closing element by means of which the passage is closed at a closing position, a closure through which the closing element is held at the closing position such that it is rotatable relative to the main body and secured against opening of the passage, and a closure lock, which is automatically activated at the closing position and through which the closure is blocked at the closing position, said closure lock comprising a grip element used for releasing the closure lock and configured for operation by hand without the use of a tool.

The fact that the closing element of the component according to the present invention is supported rotatably relative to the main body reduces the wear of the closing element. The closing element is able to yield to a torsional load by rotating, without it having to be supported in the closure.

The closing element is secured at the closing position by means of the closure, so that the passage is reliably closed. The closure lock secures the closure, so that the latter cannot open by accident. In order to allow the closure lock to be easily released by hand also under adverse conditions, the grip element is configured for operation by hand without the use of a tool. Due to the automatic activation of the closure lock at the closing position, an operator need not worry about the adequate activation of the closure lock, whereby handling will be facilitated.

The present invention can be improved still further by the embodiments following hereinafter, which are each advantageous individually and which are adapted to be combined with one another independently of one another.

It will, for example, be of advantage, when an operator is able to see immediately, whether the closure lock is activated. This is accomplished e.g. by an indicator element, which is visible from outside the component in the activated condition of the closure lock and concealed, and thus not visible from outside the component, in the non-activated condition of the closure lock, or, alternatively, which is visible from outside the component in the non-activated condition of the closure lock and arranged such that it is concealed in the activated condition of the closure lock. In this way, the indicator element indicates that the closing position of the component has been reached, that the closing element is secured in position in the closure and that the closure is locked by the closure lock. Also two indicator elements may be provided, only one of them being visible when the closing position has not yet been reached and only the other one being visible when the closing position has been assumed.

The visibility of the indicator element can easily be improved, when it projects beyond its surroundings in the visible condition. In particular, the indicator element may project in the direction of a longitudinal axis of the closing element, in the event that a closing bolt is used as a closing element this may e.g. be the longitudinal axis of the closing bolt, and/or in the direction in which the closing element is inserted into the main body. Preferably, the indicator element is arranged on a main body side which faces away from the opening. Each of the two above measures has, independently of the respective other measure, the effect that the indicator element cannot be damaged by components that are attached to the opening.

According to a further advantageous embodiment, the indicator element may be provided on the closing element or on the grip element. In the case of this embodiment, the indicator element directly indicates the position of the closing element or of the grip element. In particular, the indicator element may be provided in a closing element portion that is located in the closure and/or the closure lock at the closing position. Alternatively, an indicator element may also be arranged on a head of the closing element. The closure and the closure lock may be coupled in a rotationally fixed manner at the closing position.

The closure lock is preferably configured such that it is activatable or activated exclusively at the closing position at a predetermined position of the closure, in particular at a single predetermined position of the closure. This will reliably prevent the closure from being locked prematurely, i.e. before it has fully reached the closing position, and the closing element from being secured only incompletely at the closing position.

The closure lock may comprise at least two locking elements, which enter into locking engagement with one another, and the indicator element may be connected to one of the locking elements in a motion-transmitting manner. In this embodiment, the indicator element indicates the position of the locking element connected thereto. The at least two locking elements are movably positively guided relative to one another in a direction of activation.

According to a structurally simple variant, the indicator element may be connected by a material bond to one of the locking elements, in particular monolithically, e.g. by primary forming or reshaping. If the indicator element is a separate part, also a form-fit connection may be provided between the indicator element and one of the locking elements.

According to a further embodiment, a cover member may be provided, which is movable relative to the indicator element, in particular movable to a position where it covers the indicator element, and which may be connected to one of the locking elements in a motion-transmitting manner. The cover member may be arranged on the main body such that it is movable between an uncovering and a covering position depending on the relative position of the locking elements. At the covering position, the cover member will then cover the indicator element, so that the indicator element will not be visible from outside. At the uncovering position, the indicator element and the cover member have been moved, in particular shifted, relative to one another from an overlay position, preferably against the effect of a retaining spring, so that the indicator element will be visible from outside.

According to an embodiment, the cover member may have an annular shape and the indicator element may have the shape of a pin, the indicator element being arranged inside the cover member. Hence, the indicator element can be covered or uncovered through a relative movement between the annular cover member and the pin-shaped indicator element. Through the annular shape of the cover member, it is easily achieved that in the case of a movement of the cover member relative to the indicator element, the indicator element can be covered at any rotatory covering position of the cover member and that the indicator element will only be visible from outside at the uncovering position.

The cover member may be connected to one of the locking elements via a material bond, in particular monolithically, e.g. by primary forming or reshaping. The locking element may also be fixed to the cover member by a fastening element, e.g. at least one screw or at least one rivet. The indicator element may be coupled to one and the cover member to the other locking element of the closure lock, so that the position of the locking elements relative to one another will automatically be transferred to the position of the cover member relative to the indicator element.

Furthermore, the indicator element may be provided on the closing element and the cover member on the grip element, or the indicator element may be provided on the grip element and the cover member on the closing element. Both said embodiments are expedient especially in cases where the grip element is connected to a locking element of the closure lock, so that the position of the grip element is representative of the position of the locking element connected to the grip element. The indicator element and the cover member will then indicate the position of the grip element relative to the closing element.

Irrespectively of whether an indicator element or a cover member or both said elements are provided, various structural designs may be possible for configuring and arranging the locking elements of the closure lock.

For example, the closing element may be provided with a locking element on its end face, in particular on the end face pointing in the direction in which the closing element is inserted into the main body.

At least one of the locking elements may be spring loaded by a retaining spring, so that automatic activation of the closure lock is made possible by the effect of the retaining spring.

The closure lock may be configured as a locking device, which, at the closing position, and preferably exclusively at the closing position, locks in position automatically and blocks the actuation of the closure. In such an embodiment, the locking elements may be configured e.g. as a locking projection and a locking-type reception means, the locking projection being preferably deflectable against the action of a retaining spring.

According to an advantageous embodiment, the locking elements, e.g. the locking projection and the locking-type reception means, enter into engagement with one another only at a predetermined relative position, so that, as has already been explained hereinbefore, an activation of the closure lock outside the closing position will be excluded.

The closure may comprise closure elements on the closing element, which are especially adapted to rotatably enter into engagement with one another, and a reception means for the closing element, said reception means being rotatably supported on the main body. The closure elements, when in engagement with one another, fixedly hold the closing element in the reception means. The closure elements may define e.g. an internal thread and an external thread or a bayonet lock. This type of lock is actuable by a rotational movement.

The rotatable support of the reception means in the main body reduces the wear of the closing element on the one hand. On the other hand, the rotatable arrangement of the reception means and, in particular, of the whole closure on the main body prevents the closure from having loads applied thereto and from opening, when the closing element is acted upon by a load during rotation.

In the case of such a structural design of the closure according to an advantageous further development, the locking elements of the closure lock will be able to enter into engagement or locking engagement with one another preferably only at a single predetermined position of the closure, so as to prevent an activation of the closure lock as long as the closing position has not yet been fully reached. This predetermined position may be a predetermined relative rotational position, a predetermined depth, e.g. a screw-in depth, or a combination of both.

In order to prevent an unintentional simultaneous release of the closure lock and of the closure, it will be of advantage when the closure lock is released by a movement in a direction other than the direction of movement resulting in a release of the closure. In particular, it will be advantageous when the closure is releasable by a rotational movement and the closure lock by a preferably substantially translational movement perpendicular to the rotational movement. In the case of this measure, two different movements for removing the closing element are necessary, and this provides particularly high security against inadvertent removal.

Such a predetermined position can be reached e.g. by a thread whose circumference is interrupted at one location, the interruption of the thread defining a locking-type reception means for a locking projection. With this kind of structural design, the locking projection will only be able to enter into engagement with the recess, if, in addition to the predetermined rotational position, also a specific screw-in depth has been reached. If the screw-in depth has not yet been reached, the locking projection will not arrive at a position in which it overlies the recess, but preferably its end face will still abut on the thread.

If an embodiment of this type is provided with an indicator element, the latter may be coupled to the locking projection in a motion-transmitting manner, so that it will indicate the locking engagement of the locking projection and thus the closing position.

In the activated condition of the closure lock, in particular the movability of the locking elements relative to one another, or of the reception means and of the closing element relative to one another, may be blocked at least in a direction opposite to the actuating direction of the closure, so that the closure cannot be released.

According to an additional advantageous embodiment, the reception means may be arranged as a separate part in a passage opening for the closing element. If, for example, the component for lifting, lashing or stop technology is a shackle or a shackle-shaped component with two side pieces, which delimit the opening and into the ends of which the closing element is inserted in an insertion direction, the reception means may be provided, preferably in a rotatable manner, on one of these side pieces.

The reception means may, in one embodiment, extend the passage opening, preferably in the pass-through direction in a direction pointing away from the opening of the main body, whereby a larger support area for the closing element is provided. The larger support area leads to a smaller contact pressure per unit area and, consequently, to a higher wear resistance and load-bearing capacity of the component.

On its circumference, the reception means can be provided with form-fit elements for tools and for gripping by hand, said form-fit elements having e.g. a polygonal outer contour. The reception means may be configured as a tubular or nut-shaped hollow body. In addition, the reception means may be provided with an internal thread for screwing-in the closing element. The reception means may also be cap-shaped, so that it will close the passage opening at least partially.

The grip element serves to release the closure lock, so that the closure will be operable again. The grip element is preferably supported such that it is rotatable relative to the main body. In particular, the closure lock may here be rigidly coupled to the closure such that a movement in a direction of rotation is prevented, so that the closure and the closure lock can rotate integrally with one another. This measure guarantees that also the closure lock will remain force-free, when the closing element is acted upon by a rotational load, and will not wear or fail in the case of an excessive load on the closing element.

According to a further embodiment, the grip element may be supported in the reception means such that it is movable relative thereto, in particular such that it is linearly movable or pivotable. This embodiment leads to a structurally simple solution, since the grip element rotates integrally together with the reception means and the closure. Preferably, the direction in which the grip element is actuated is decoupled from the direction in which the closure is actuated. If, for example, the closure is actuated by a rotational movement, the grip element will, for releasing the closure lock, preferably be moved translationally in a direction parallel to the axis of rotation, i.e. perpendicular to the rotational movement of the closure, or vice versa.

A direct actuation of the closure lock by the grip element is possible, when, according to a further advantageous embodiment, the grip element is monolithically connected to a locking element of the closure lock.

According to a further advantageous embodiment, the grip element may form a closure lid for a reception opening of the main body, said reception opening receiving therein the closing element, and/or the reception means, so that contaminations are kept away from the reception means and/or the reception opening.

The grip element may have provided therein an opening through which the indicator element extends. If the grip element is simultaneously the cover member for the indicator element, the opening may be surrounded by a projecting ring, which covers the indicator element at the covering position.

For easier handling, the grip element may have two diametrically opposed handling areas, so that the grip element can be gripped with only one hand by means of a pincer grip. The handling areas may be provided on a circumferential surface of the reception means. The grip element may be spring-loaded, so that it can only be operated against the effect of the spring force. If the grip element simultaneously serves as a locking element of the closure lock, this spring may also be used for establishing the locking engagement at the closing position.

According to a further embodiment, the grip element itself may be structurally united with the retaining spring, so that the number of necessary parts will be reduced. The retaining spring can thus be actuated directly. This kind of structural design may be realized by a leaf spring, whose one end is secured to the reception means and whose other end, which for ergonomic reasons is preferably bent as a retaining spring, serves as a grip element and projects beyond the reception means.

In addition, in order to reduce the number of parts still further, the retaining spring itself may define the cover member. The retaining spring may here have a disk-shaped area with a passage for the indicator element. As long as the retaining spring is deflected, i.e. the closing position has not yet been reliably reached, the disk-shaped area covers the indicator element.

According to a further advantageous embodiment, the component may be provided with a safety catch by means of which the closing element is secured in position on the main body in the open condition of the passage. The safety catch can only be overcome by applying an additional force, so that the closing element is captively held in the open condition of the passage. It goes without saying that, instead of the safety catch, also a locking device may be provided. Although the latter has, on the one hand, the effect that the closing element is secured in position more effectively, it necessitates, on the other hand, a more complicated activation, a circumstance which will especially be disadvantageous in the event that the opening of the main body must be closed quickly with one hand.

By means of the safety catch, the closing element is prevented from dropping off from the main body in the open condition of the closure. Especially in outdoor and offshore applications, where the components of the lifting, lashing or stop mechanisms are often used very high above the ground, e.g. on masts or cranes, a dropping closing element may cause substantial injuries on the part of the personnel working on the ground.

The safety catch may comprise a spring, which encloses the closing element at least partially, and a groove, which is engaged by the spring. The spring may e.g. be fixedly attached to the main body or the closing element and it may have a polygonal contour having a smaller clear width than the closing element or the passage opening. The groove on the closing element may, e.g. in cases where a closing bolt is used as a closing element, be spaced apart from a closure member of the closing element, such as an external thread, by less than one diameter.

If the component is a shackle or a shackle-shaped component with two side pieces, through which the closing element must be passed, the safety catch is, according to a further advantageous embodiment, provided on one of these side pieces and the closure is provided on the other side piece.

The component for lifting, lashing or stop technology according to one of the above described embodiments may also be configured as an integral constituent part of some other device for lifting, lashing or stop technology, such as shorteners or tensioners.

In the following, the present invention will be explained exemplarily in more detail making reference to the enclosed figures. For the sake of simplicity, elements corresponding to one another as regards function and/or structural design are provided with like reference numerals in the figures and in the description of the embodiments following hereinafter. In addition, unless explicitly stated, the discussion of the further embodiments will always only deal with the respective differences in comparison with preceding embodiments.

In accordance with the above statements concerning the respective embodiments, which are each advantageous individually, the features differing in the case of the individual embodiments can be combined with one another. In addition, individual features may be omitted in accordance with the above statements, provided that the advantage entailed by the feature in question is not of essential importance.

FIG. 2 shows a closing element of the embodiment according to FIG. 1 in a schematic perspective view;

FIG. 3 shows a grip element of the embodiment according to FIG. 1 in a schematic perspective view;

Figure 1:
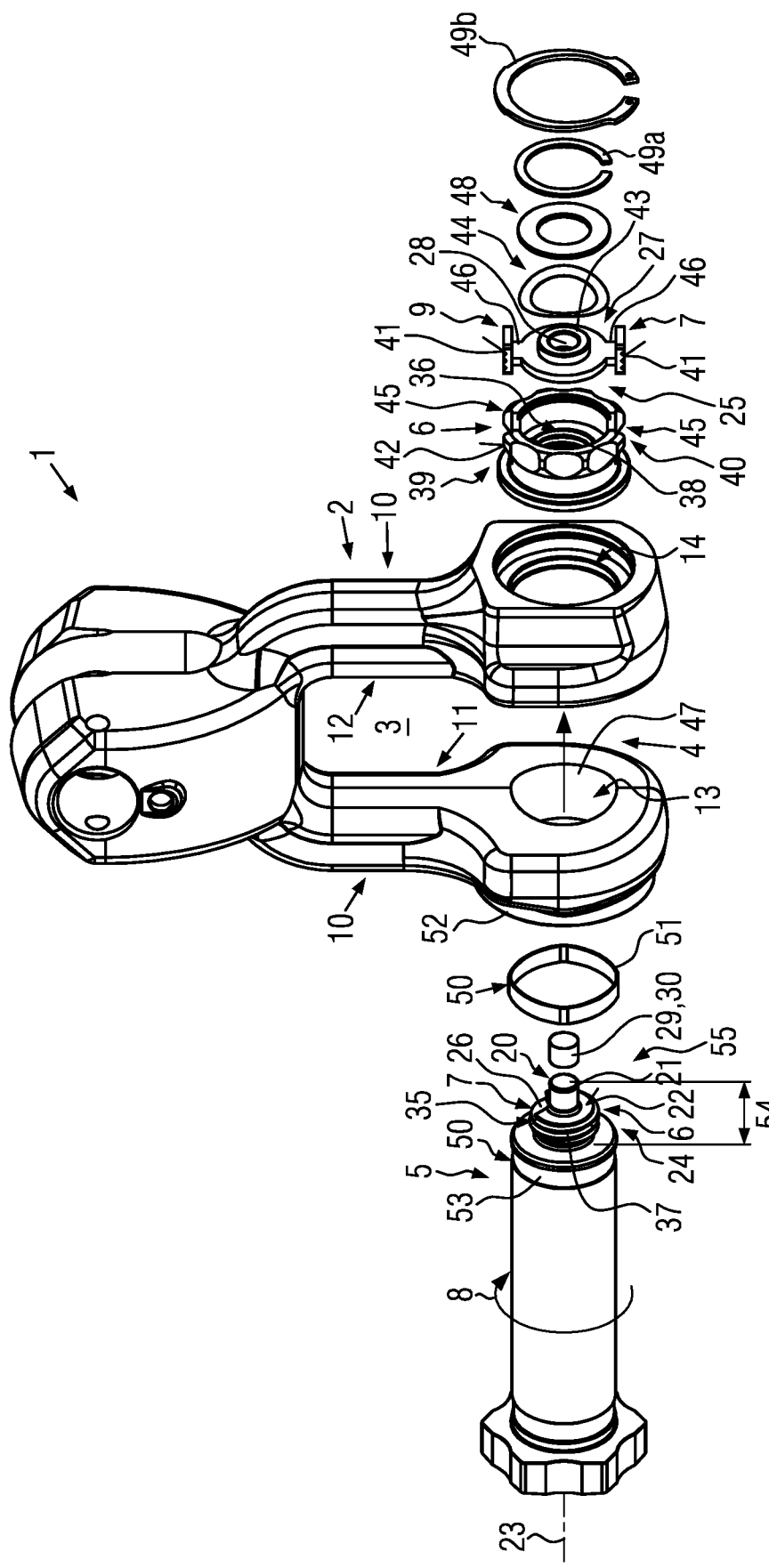
FIG. 1 shows a first embodiment in a schematic, perspective exploded view.

FIG. 1 exemplarily shows, in a schematic exploded view, the constituent parts of a possible embodiment of a component 1 according to the present invention used for lifting, lashing or stop technology. The component 1 is used for lifting loads, for lashing loads to be transported or for stopping lifting devices in outdoor and offshore use.

The component 1 comprises a main body 2 defining an opening 3. The opening 3 is adapted to have attached thereto a load, a lifting device or a stop device.

The opening 3 comprises at least one passage 4 through which the lifting, lashing or fastening device (not shown) can be introduced in the opening 3. The passage 4 is reliably closable by a closing element 5. When the opening 3 and the passage 4 are reliably closed, the closing element 5 is at a closing position (not shown).

In order to secure the closing element 5 at the closing position, a closure 6 and a closure lock 7 are provided.

The closing element 5 is secured in position by means of the closure 6, so that it cannot drop off, not even under load.

In order to keep the closure 6 force-free, when torsional and rotational forces 8 act on the closing element 5, and in order to cause uniform wear of the closing element 5 during operation throughout the whole circumference thereof, the closing element 5, when occupying the closing position, is held by the closure 6 such that it is rotatable relative to the main body 2.

The closure lock 7 will automatically be activated, when the closing element 5 arrives at the closing position. The closure 6 is blocked by means of the closure lock 7 and cannot be operated.

For opening the closure 6, it is first necessary to operate the closure lock 7. In order to allow this easily, also for operating personnel wearing e.g. gloves, under the environmental conditions that are typical of outdoor and offshore use, a grip element 9 is provided, which is configured for operation by hand without the use of a tool. When the grip element 9 is operated, the closure lock 7 can be released and, when the closure has been opened, the closing element 5 can be moved out of the passage 4 so as to clear the opening 3.

FIG. 1 shows, only exemplarily, a shackle-shaped component 1. In the case of such a shackle-shaped component 1, two side pieces 10 enclose the opening 3 at two opposed sides 11, 12 of the opening 3. The passage 4 is located e.g. at the ends of the side pieces 10, where preferably two passage openings 13, 14 are provided, which are in alignment with one another and into which the closing element 5 for closing the passage 4 is inserted, said closing element 5 being normally bolt-shaped in the case of a shackle-shaped component 1. The closing element 5 may, however, also penetrate the side pieces 10 at a location other than the ends of said side pieces.

Component 1 may comprise an indicator element 20, which is arranged so as to be either visible from outside the component 1 in the activated condition of the closure lock 7 and concealed in the non-activated condition of the closure lock 7, or visible from outside the component 1 in the non-activated condition of the closure lock 7 and concealed in the activated condition of the closure lock 7. It follows that, by means of the indicator element 20, a user will immediately be able to see, whether the closing element 5 is adequately arranged at the closing position, either because the indicator element 20 cannot be seen or, alternatively, because the indicator element 20 can be seen.

In the case of the embodiment according to FIG. 1, the indicator element 20 is a pin 21 located on an end face 22 of the closing element 5, which, only exemplarily, has the shape of a bolt. Generalizing it can be said that the indicator element 20 may project beyond the closing element 5 in the direction of a longitudinal axis 23 of the closing element 5 and it may have any base area shape.

The indicator element 20 need not necessarily be arranged on the closing element 5 nor need it necessarily be coupled to the latter in a motion-transmitting manner, but it may e.g. be arranged on the grip element 9 or be coupled thereto in a motion-transmitting manner. Likewise, two indicator elements 20 may be provided (not shown), one of them being exclusively visible before the closing position has been reached and the other one being exclusively visible after the closing position has been reached.

In order to realize an automatic activation of the closure lock 7 at the closing position in a technically simple manner, the closure lock 7 may have a locking mechanism with two locking elements that enter into locking engagement with each other. Preferably, the locking elements 24, 25 will only lock, when the closing element 5 occupies the closing position. The indicator element 20 may be connected to one of the locking elements 24, 25 in a motion-transmitting manner, and in particular it may be integrally connected to one of the locking elements 24, 25 via a material bond created by primary forming or reshaping.

If two indicator elements 20 are provided, each of the locking elements 24, 25 may be connected to one respective indicator element in a motion-transmitting manner and/or be formed integrally therewith.

In the case of the component 1 shown in FIG. 1, one locking element 24 is a sector-shaped recess 26 in a circumferential surface of the closing element 5. The pin-shaped indicator element 20 is monolithically connected to the closing element 5 at the end face 22 of the latter and is therefore stationary relative to the locking element 24. The indicator element 20 thus indicates a position of the locking element 24. The other locking element 25 is located directly on the grip element 9 in the case of this embodiment, as will be explained hereinafter.

In order to make the indicator element 20 visible either exclusively at the closing position or exclusively outside the closing position, a stationary cover member 27, preferably, however, a cover member 27 that is movable to a position where it covers the indicator element 20, may be provided. Also this cover member 27 may be connected to one of the locking elements 24, 25 in a motion-transmitting manner. In the case of the embodiment shown, the cover member 27 has an annular shape, the indicator element 20 projecting through the central opening 28 of the annular cover member 27. The indicator element 20 and the cover member 27 are movable relative to one another, so that, depending on the relative position of the locking elements 24, 25, the cover member 27 can be moved to a position where it fully covers the indicator element 20. When the pin 21 is fully covered by the cover member 27, it is not visible.

The indicator element 20 may be provided with a mark 29 that differs in color from its surroundings, so that the indicator element 20, when no longer covered by the cover member 27, will be clearly visible from afar. The mark 29 may be configured in the form of a separate sleeve 30 and/or it may be defined by a coating.

As can be seen in FIG. 1, the cover member 27 may be connected monolithically to the grip element 9 or the locking element 25 through primary forming or reshaping. Instead of a monolithic structural design, also a motion-transmitting coupling between the grip element 9, the locking element 25 and the cover member 27 via coupling members (not shown) may be provided.

The above-described arrangement is reversible: either the indicator element 20 is, as shown, located on the closing element 5 and the cover member 27 on the grip element 9, or the indicator element 20 is located on the grip element 9 and the cover member 27 on the closing element 5.

The closure 6 comprises closure elements 35, 36 which are adapted to be rotatably brought into engagement with each other. One of the closure elements 35, configured e.g. in the form of an external thread 37, is provided on the closing element 5. The other closure element 36, configured e.g. in the form of an internal thread 38, is provided on a reception means 39, which is preferably rotatably held on the main body 2. The reception means 39 may be located partly in a passage opening 14, in particular on the passage-opening side facing away from the opening 3 and the passage 4, respectively.

When the reception means 39 extends the passage opening 14, a larger support area for the closing element 5 will be defined, so that the contact pressure per unit area between the closing element 5 and the main body 2 in the case of high loads acting on the closing element 5 will be reduced. As can be seen in FIG. 1, the reception means 39 may be configured in the form of a sleeve or a nut and, in the mounted condition, it may project away from the main body 2 and protrude beyond the main body 2, respectively. The reception means 39 may, on one end thereof, be provided with form-fit elements 40 on its outer circumference, said form-fit elements 40 allowing the reception means to be handled, in particular rotated, by means of a tool or by hand.

The grip element 9 is guided in the reception means 39 in a linearly movable manner, preferably parallel to the axis of rotation of the rotational movement with which the closure 6 is actuated. Two diametrically opposed handling areas 41 of the grip element 9 are located preferably on the outer side of a circumferential surface 42 of the reception means 39, preferably in the area of the form-fit elements 40, and are accessible from outside. The reception means 39 may be provided with projections or ribs on at least one side of the grip element 9, so as to protect the latter. The position of the handling areas 41 in the area of the form-fit elements 40 allows simultaneously a movement of the grip element 9 and thus of the locking element 25 connected to the grip element 9 and a rotation of the reception means 39 for operating the closure element 36 with only one hand. Hence, the closure lock 7 and the closure 6 can be operated simultaneously with only one hand.

The grip element 9 defines a closure lid closing, in this case together with the pin 21 projecting through the central opening 28, the passage opening 14 and the extension of the passage opening 14 defined by the interior 43 of the reception means 39.

The grip element 9 is forced by a retaining spring 44 to a rest position, in the case of the embodiment according to FIG. 1 in the direction of the opening 3 and the passage 4, respectively. Two arms 46 of the grip element 9, which are guided in slots 45 of the reception means 39 and on the outer ends of which the handling areas 41 are located, define the guide of the grip element 9. The grip element 9 is adapted to be moved relative to the reception means 39 along the longitudinal axis 23 of the closing element 5, i.e. in the pass-through direction of the latter and in a direction opposite to said pass-through direction. In a direction away from the opening 3, the force of the retaining spring 44 must be overcome. The retaining spring 44 may be a corrugated annular spring 51, which rests on a support ring 48 on its side located opposite the grip element 9. The grip element 9, the retaining spring 44 and the support ring 48 are secured in position in the reception means 39 by means of a snap or retaining ring 49a.

The reception means 39 itself is rotatably secured in the main body 2, i.e. in the passage opening 14 of the latter, by means of a further snap or retaining ring 49b.

Finally, component 1 may additionally have a safety catch 50, which captively holds the closing element 5 at an open position on the main body 2, with the passage 4 being fully open.

The safety catch 50 can be overcome by applying an increased force and represents only a kind of force-fit-type intermediate detent, so as to prevent the closing element 5 from dropping off from the main body 2, when the closure 6 is in the open condition. It facilitates the handling of component 1 because the closing element 5 need not be held or secured in position by the user in the open condition of the passage 4.

The safety catch 50 comprises an annular spring 51, which is fixed e.g. to the main body 2, in the passage opening 13 or on an annular collar 52 extending the passage opening 13 outwards, in a direction away from the passage 4. As shown, the annular collar 52 may be an integral component of the main body 2 or a separate part that is fixed to the main body 2. The annular spring 51 has an approximately polygonal outer circumference with a clear width that is smaller than the portion of the closing element 5 to be passed through the passage opening 13 during transfer to the closing position. The closing element 5 may have provided thereon a groove 53, into which the annular spring 51 snaps in place. The groove 53 is preferably located at a distance 54 from the end 55 of the closing element 5 corresponding to the distance between the annular spring 51 and the passage 4, so that, in the locked condition of the safety catch 50, neither the end 55 of the closing element 5 nor the indicator element 20 will project beyond the passage opening 13 and into the opening 3.

It follows that a lifting, stop or lashing device (not shown) will be prevented from touching, getting caught by or, let alone, damaging the end 55 of the closing element 5 or the indicator element 20, when it is being introduced in the opening 3 through the passage 4.

FIG. 2 shows exemplarily a closing element 5, here in the form of a closing bolt 60.

The closing element 5 is provided with the closure element 35 in the form of an external thread 37 in an area 61, e.g. on the end 55. The external thread 37 has a smaller outer diameter than the rest of the body 63 of the closing element 5, said body 63 having here, only exemplarily, the shape of a circular cylinder. On the closing element end 64 located opposite the end 55, a head 65 is arranged, whose circumferential surface is provided with form-fit and gripping elements 66, so that the head 65 can be fixed or rotated with tools as well as by hand.

The closure element 35 projects from the body 63, thus forming a flange, and extends up to the end face 22. Instead of an external thread 37, also a bayonet lock or some other closure element 35 adapted to be established by rotation may be provided. The closure element 36 provided on the side of the main body is configured complementarily to the closure element 35.

The area 61 has additionally arranged therein the locking element 24 of the closure lock 7, said locking element 24 being provided as an, in particular, sector-shaped recess 26 in a circumferential surface 67 and/or an end face 22 of the closure element 35. The recess 26 serves to receive therein a preferably spring-loaded locking projection (not shown), which lockingly engages the recess 26, when the closing element 5 has reached a predetermined screw-in depth and/or a predetermined relative rotational position.

It will be of advantage when, in cases where thread-type closure elements 35, 36 are used, the thread start is located at a predetermined angular position relative to the recess 26, so that there will always be the same relationship between the screw-in depth and the rotational position of the closing element.

The indicator element 20, which has here only exemplarily the shape of a pin, extends away from the end face 22 of the closure element 35 in the direction of the longitudinal axis 23 of the closing element 5.

FIG. 3 shows an embodiment of a grip element 9, the visible side being that which faces the opening 3 and the closing element 5, respectively. On this side, the locking element 25 configured as a locking projection 70 is provided, said locking element 25 being configured such that it is adapted to enter the recess 26 on the closing element 5. The locking element 25 is configured complementarily to the locking element 24, so that both allow as little backlash as possible, when they are in engagement with each other. Hence, the locking element 25 may be configured as a sector-shaped projection.

When the closing element 5 is turned into the reception means 39 (FIG. 1), the recess 26 will rotate relative to the locking projection 70. The grip element 9 is, due to the arms 46 in the slots 45 (FIG. 1), prevented from rotating and can only be displaced in the direction of the longitudinal axis 23 (FIG. 1) relative to the reception means 39 (FIG. 1). When, while the closing element 5 is being turned into the reception means 39 (FIG. 1), the end face 22 of the closure element 35 presses against the locking projection 70, the grip element 9 will be linearly deflected against the effect of the retaining spring 44 (FIG. 1) along the longitudinal axis 23 (FIG. 1) in a direction away from the passage 4 (FIG. 1) together with the axial movement of the closing element 5. At the moment at which the recess 26 (FIG. 2) and the locking projection 70 are brought into alignment with each other, the locking projection 70 will snap in position into the recess 26 and the closure lock 7 is activated (FIG. 1). The closure 6 can no longer be operated, since the relative rotational movement between the reception means 39 and the closing element 5 is blocked by the engagement of the locking elements 24, 25. The height 71 of the locking projection 70 is here dimensioned such that a locking engagement will not be possible before a predetermined screw-in depth has been reached. Preferably, the height 71 does not exceed one pitch of the external thread 37 on the closure body.

In the following, the function of component 1 will be explained in more detail making reference to FIGS. 4 to 9. In these figures, only the outlines of the main body 2 are, for the sake of clarity, shown by broken lines, and the reception means 39 has been omitted. In addition, the rings located beyond the grip element 9, when seen from the passage 4, have partly been omitted.

Figure 4:
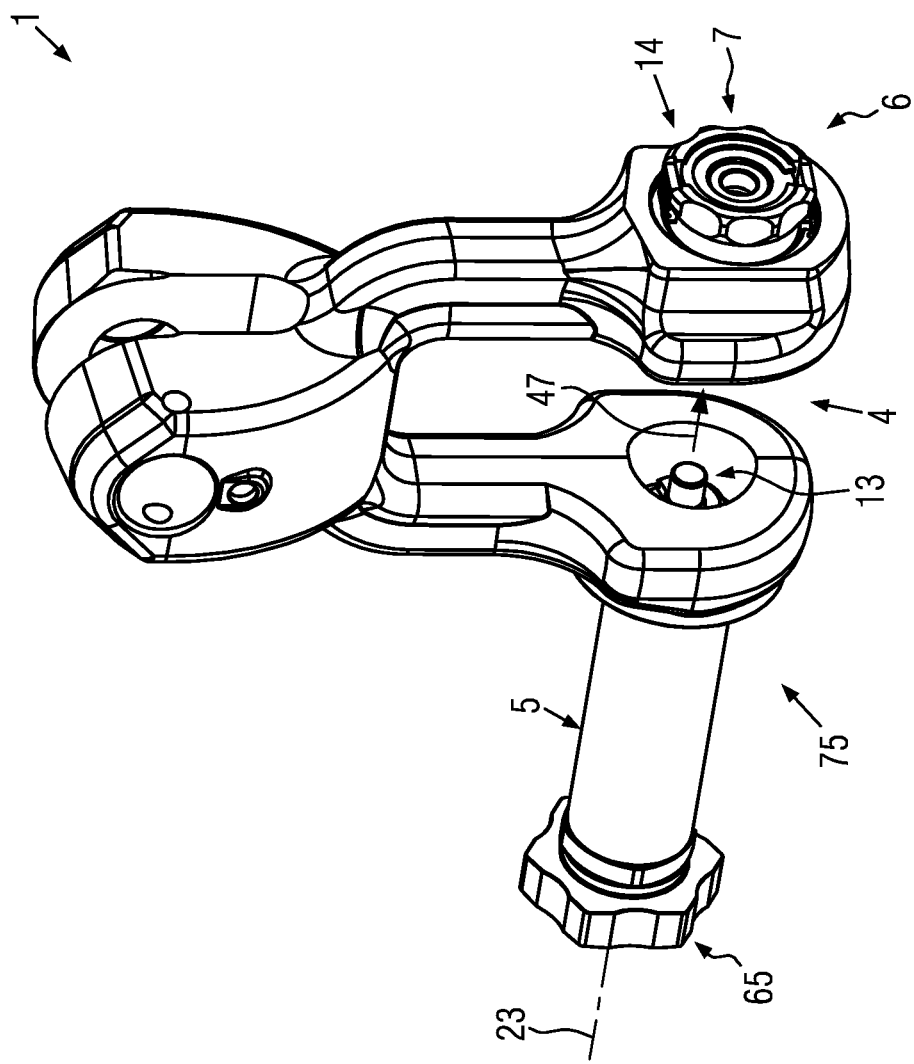
FIG. 4 shows the embodiment according to FIG. 1 in a schematic perspective view of an open position.

FIG. 4 shows the open position 75, at which the closing element 5 leaves the passage 4 fully open and is preferably held by the safety catch 50. The closing element 5 does preferably not project into the passage 4 at the open position 75, so that, when objects are introduced through the passage 4, nothing can get caught on the closing element 5.

If, starting from the open position 75, the passage 4 is now to be closed by the closing element 5, the closing element 5 will, starting from the open position 75, first be pushed into the passage 4. In so doing, it will first be necessary to overcome the holding force of the safety catch 50. This force is rated such that it can be overcome by hand, e.g. in that the user's palm presses or strikes against the head 65 in the pass-through direction 47.

The passage opening 13, which holds the closing element 5 at the open position 75, is dimensioned such that the tolerances relative to the closing element 5 are comparatively narrow, so that the latter is guided in a rotationally and slidably displaceable manner in its longitudinal axis 23 with only a small amount of play. Hence, the user need not orient the closing element 5 so as to insert it into the passage opening 14 located in opposed relationship when seen with respect to the passage 4. Due to the small tolerances and the alignment of the passage opening 13 with the opposed passage opening 14, this will take place automatically.

Figure 5:
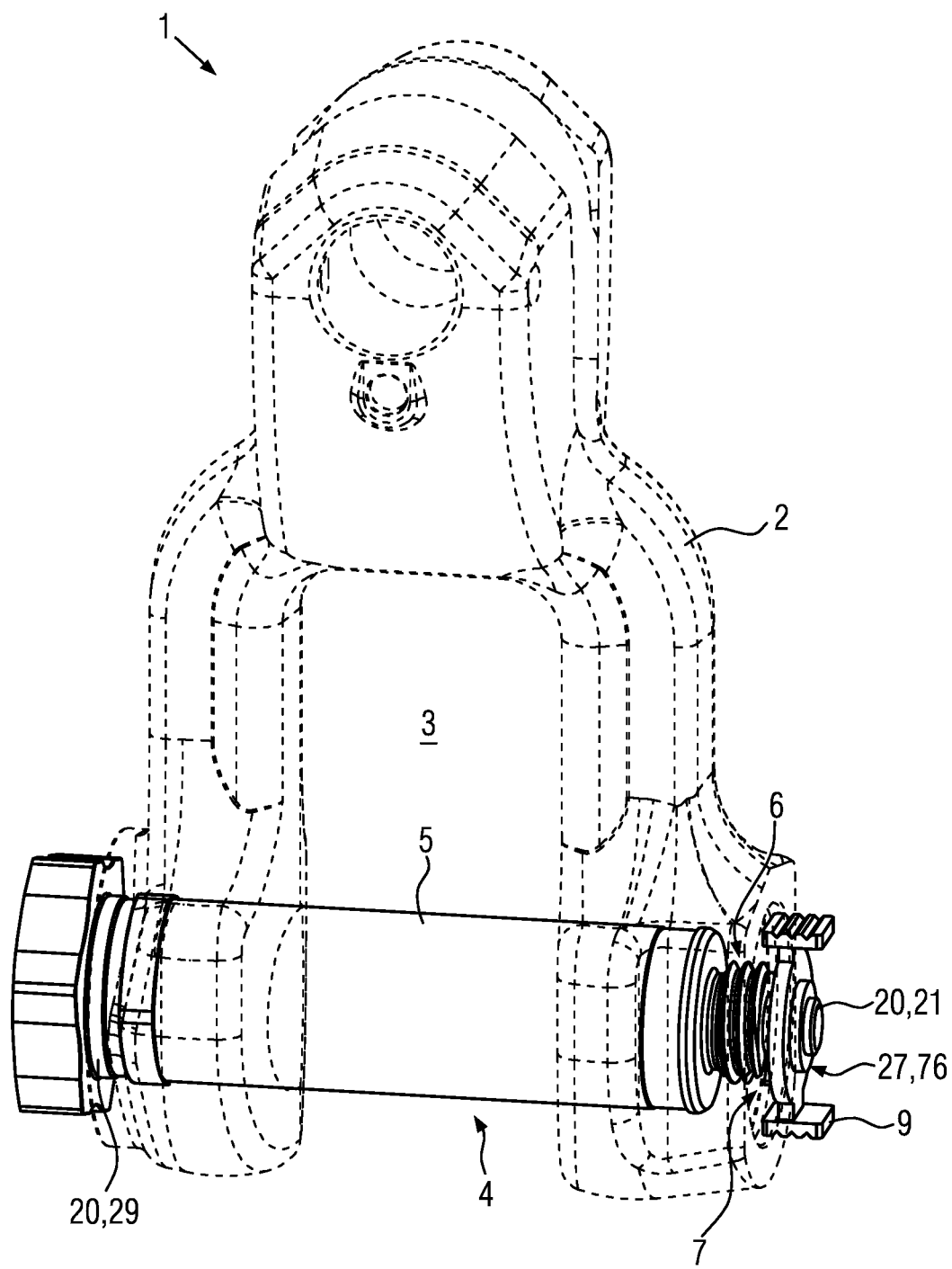
FIG. 5 shows the embodiment according to FIG. 1 in a schematic perspective view just before a closing position is reached.
Figure 6:
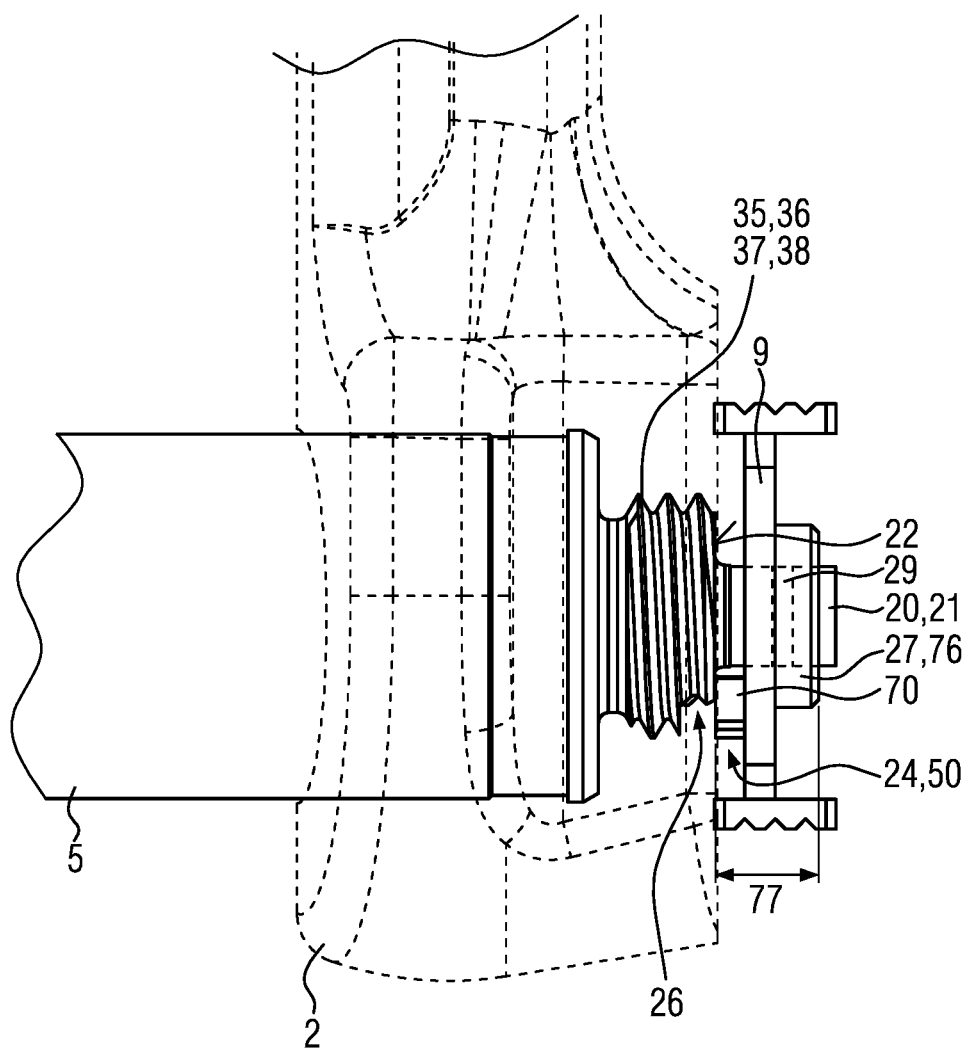
FIG. 6 shows a detail of FIG. 5.

When the closing element 5 has been inserted into the passage opening 14, the closure elements 35, 36 (FIG. 1) first meet, without being in engagement with one another. Subsequently, the closure 6 can be operated by screwing, e.g. in the embodiment shown, the closing element 5 into the reception means 39, if the closure elements 35, 36 are thread-shaped. Although the passage 4 has then already been closed, the closing position has not yet been reached, since the closure 6 is not yet closed and the closure lock 7 has not yet been activated. This condition is shown in FIG. 5 and, in more detail, in FIG. 6. The locking elements 24, 25 of the closure lock 7 need not yet be in contact with one another at this position.

When the external thread 37 and the internal thread 38 meet, they will, due to the predetermined angular position of the thread start, only enter into engagement with one another, when the rotatable reception means 39 and the closing element 5 occupy a predetermined angular position relative to one another. In the following it will be explained, only exemplarily, that the closing position is reached after two rotations.

Preferably, the locking projection 70 is spaced apart from the front end of the threaded portion in the screw-in direction by a distance corresponding to one thread pitch, when the closure elements 35, 36 just enter into engagement. The closing element 5 is screwed into the reception means 39 by one rotation before the end face 22 of the closure element 35 and the locking projection 70 contact each other. Preferably, the recess 26 has just passed the locking projection 70 in this case. During the continued rotational movement, the end face 22 of the closure element 35 is screwed-in against the effect of the retaining spring 44. Since the height 71 (FIG. 3) of the locking projection 70 corresponds to one thread pitch, the locking projection 70 will snap in position into the recess 26 after another full rotation. The closing position has now been reached.

It goes without saying that, when the thread starts are modified in comparison with the embodiment and when the height of the locking projection is modified in a corresponding manner, also a higher number or a lower number, and also a non-integer number of rotations of the closure may be necessary for activating the closure lock.

Until the closing position has been reached, the indicator element 20 is concealed by the cover member 27, which is here defined by the grip element 9. When the closure elements 35, 36 are just about to enter into engagement, the indicator element, i.e. the pin 21, does not yet enter the grip element 9, or enters the latter only incompletely, and remains covered. While screwing-in is continued, the pin 21 penetrates more deeply into the central opening 28 of the cover member 27, but cannot be seen, because it is covered e.g. by an annular bead or a collar 76 of the grip element 9. The height 77 of the cover member 27 from the locking projection 70 up to the end of the annular bead 76 is preferably smaller than the distance from the base of the recess 26 up to the end of the pin 21. Therefore, the pin 21 remains covered as long as the end face 22 of the closure element 35 presses against the locking projection 70. When the locking projection 70 snaps in position into the recess 26 due to the retaining spring 44, the pin 21 will project with its free end beyond the cover member 27 and will be visible from outside. In addition, the mark 29 will be visible. The pin 21 may, for example, be provided with a green mark 29 indicating, if visible, to a user that the closing position has been assumed correctly, since the closure 6 and the closure lock 7 are activated.

Figure 7:
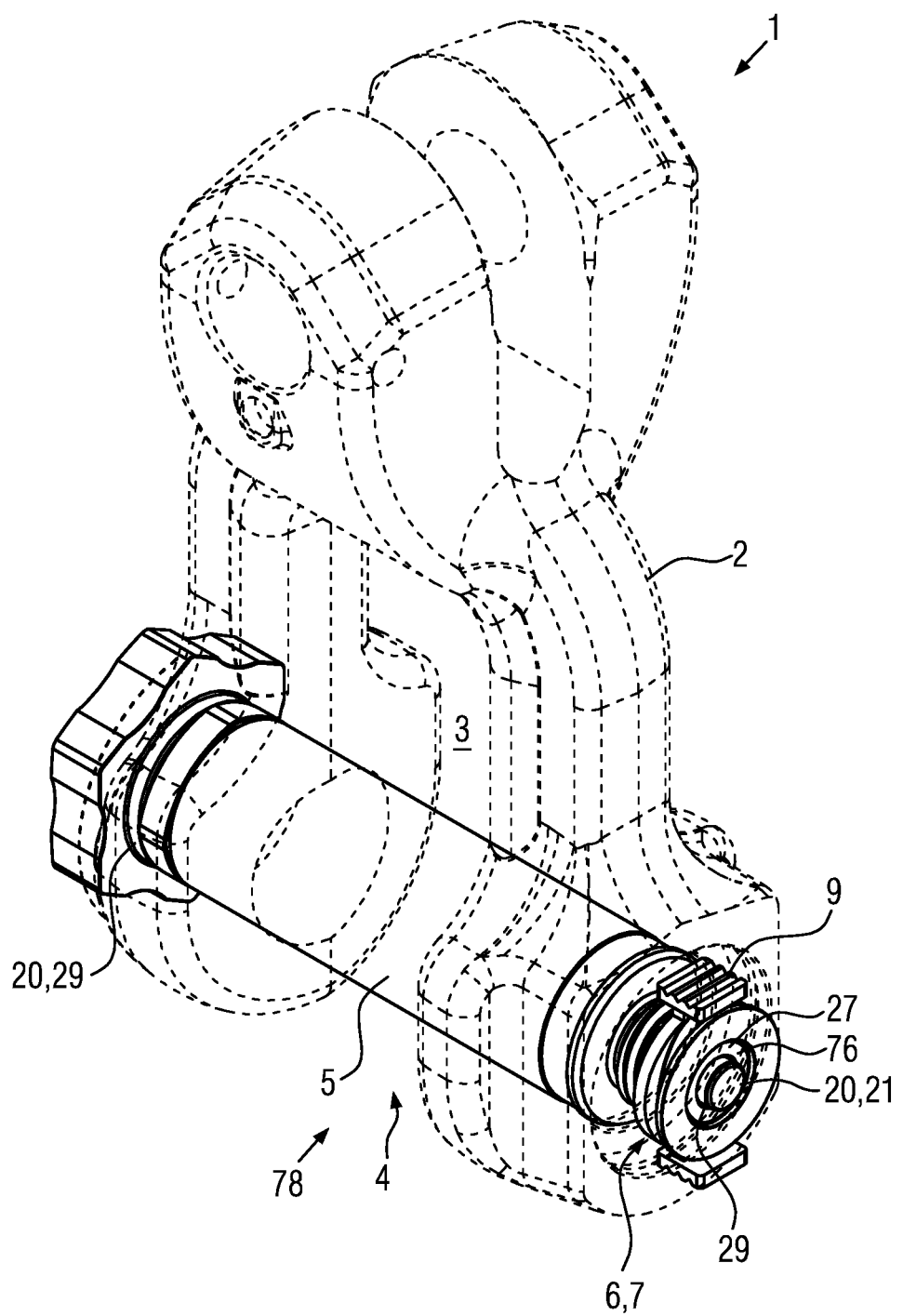
FIG. 7 shows the embodiment according to FIG. 1 in a schematic perspective view at the closing position.
Figure 8:
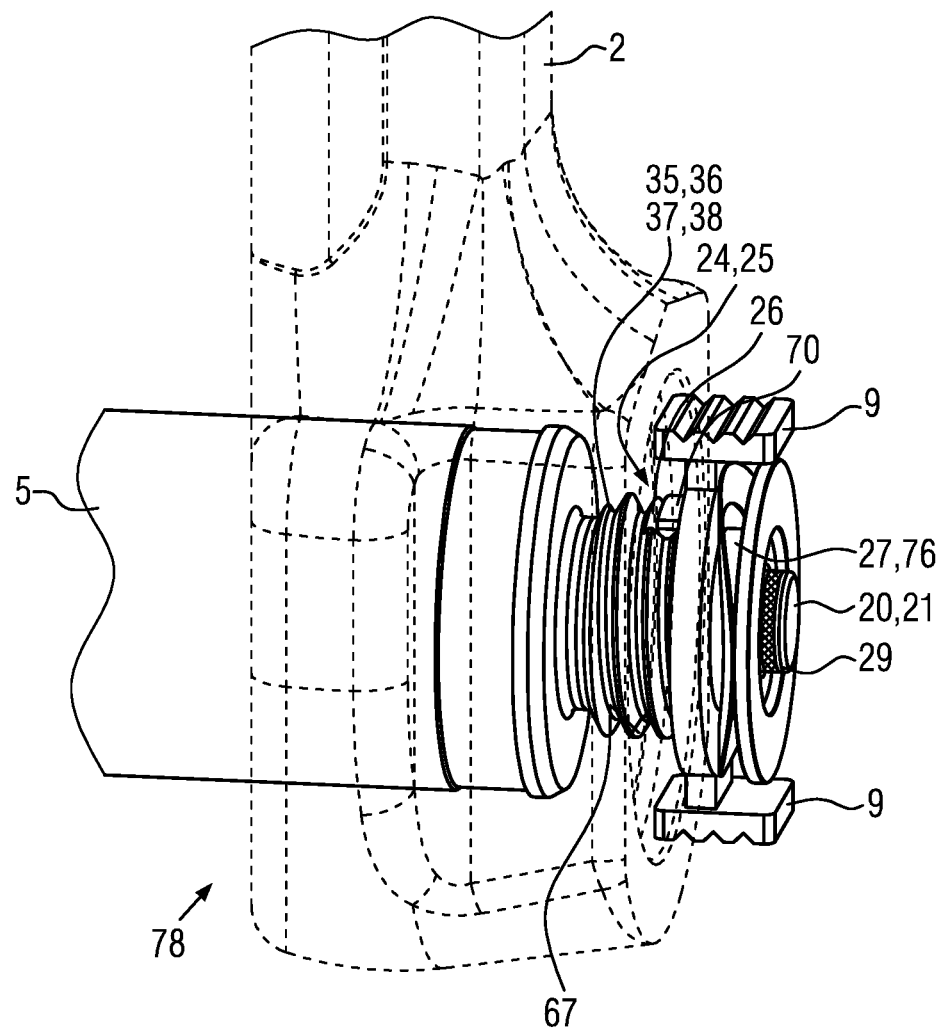
FIG. 8 shows a detail of FIG. 7.

The closing position 78 is shown in FIG. 7 and in more detail in FIG. 8. As has been explained, the closure elements 35, 36 are fully in engagement, e.g. due to the fact that the external thread 37 and the internal thread 38 are screwed together via two rotations, and because the closure lock 7 is activated due to the locking engagement of the locking elements 24, 25. The indicator element 20 is visible from outside. This can also be seen in a sectional view in FIG. 9.

Figure 9:
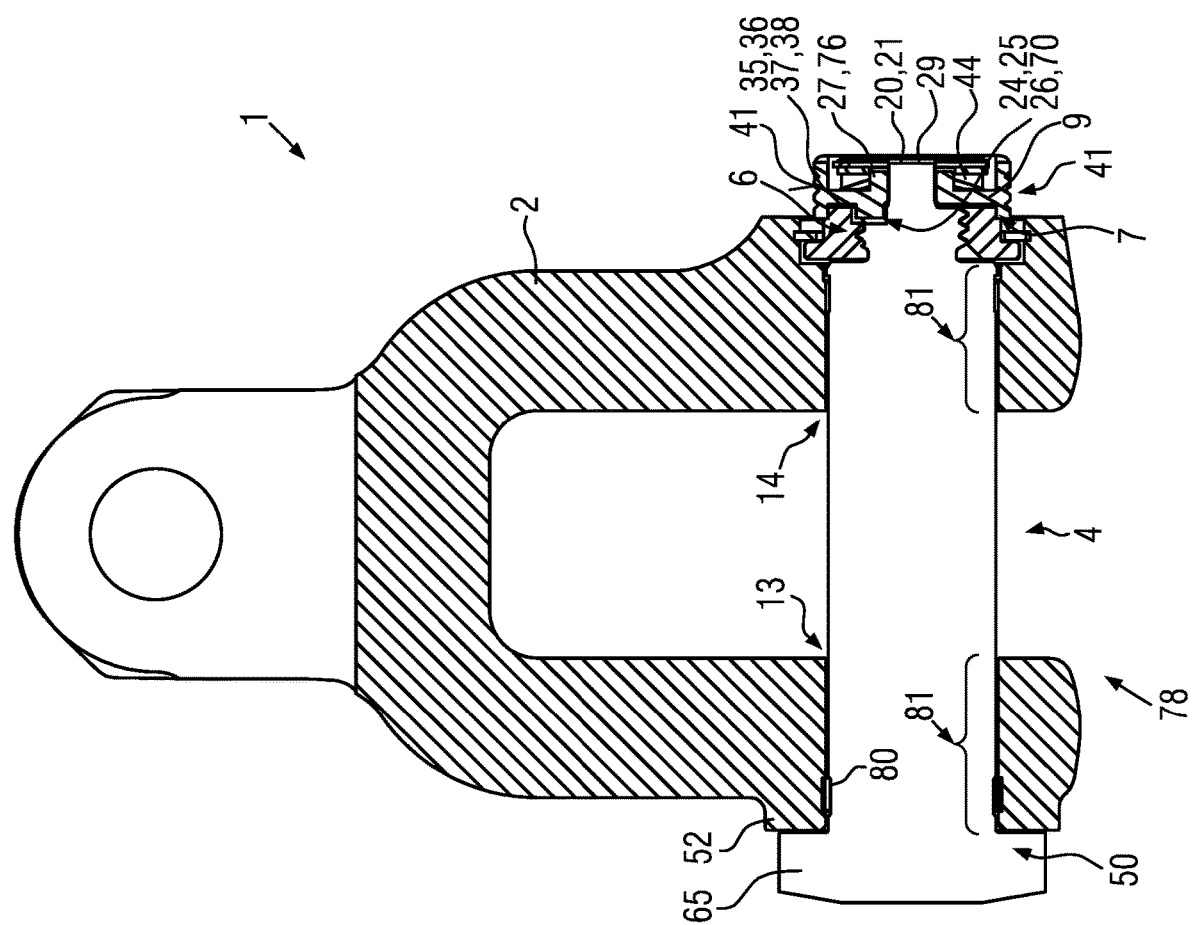
FIG. 9 shows the embodiment according to FIG. 1 in a schematic sectional view of the closing position.

As can be seen in FIG. 9, the safety catch 50, in addition to the closure 6, may hold the closing element 5 at the closing position 78 via a further groove 80 close to the head for the purpose of further securing. In this way, a possible axial backlash of the closing element 65 can be reduced.

In FIG. 9 it can also be seen that, due to the ring 52 attached to the outer side of the passage opening 13 and the reception means 39 attached to the outer side of the passage opening 14, the passage openings 13, 14 can provide large support surfaces 81, which take up high loads with low contact pressures per unit area.

For opening the passage 4, the grip element 9 is gripped at the opposed handling areas 41 and moved away from the main body 2 along the longitudinal axis of the closing element 5 against the effect of the retaining spring 44. The locking elements 24, 25 are thus moved out of engagement and the closure lock 7 is deactivated. The user will now be able to rotate the reception means 39 via the handling areas 41 in one movement by hand, when he simultaneously holds the head 65 of the closing element with the other hand. In this way, he will release the closure 6. When the closure 6 has been fully released, he will be able to pull out the closing element 5 until the latter is held at the open position 75 by the safety catch 50.

Figure 10:
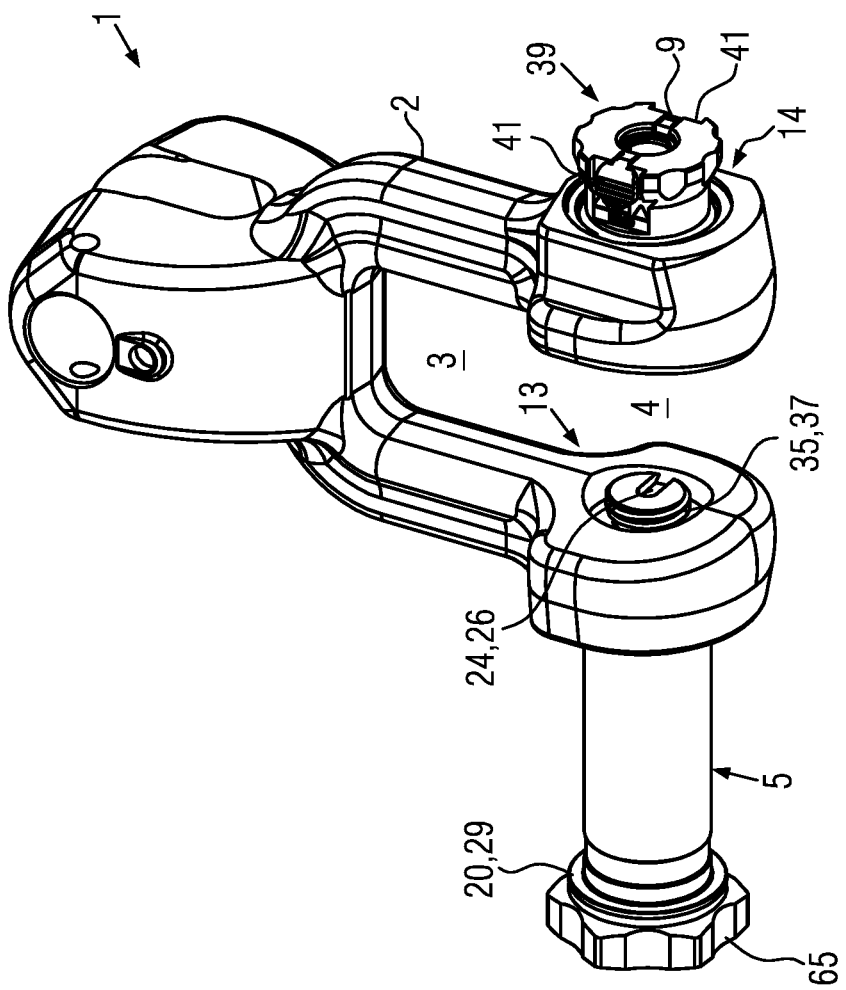
FIG. 10 shows a further embodiment of the present invention in a schematic perspective view of an open position.
Figure 11:
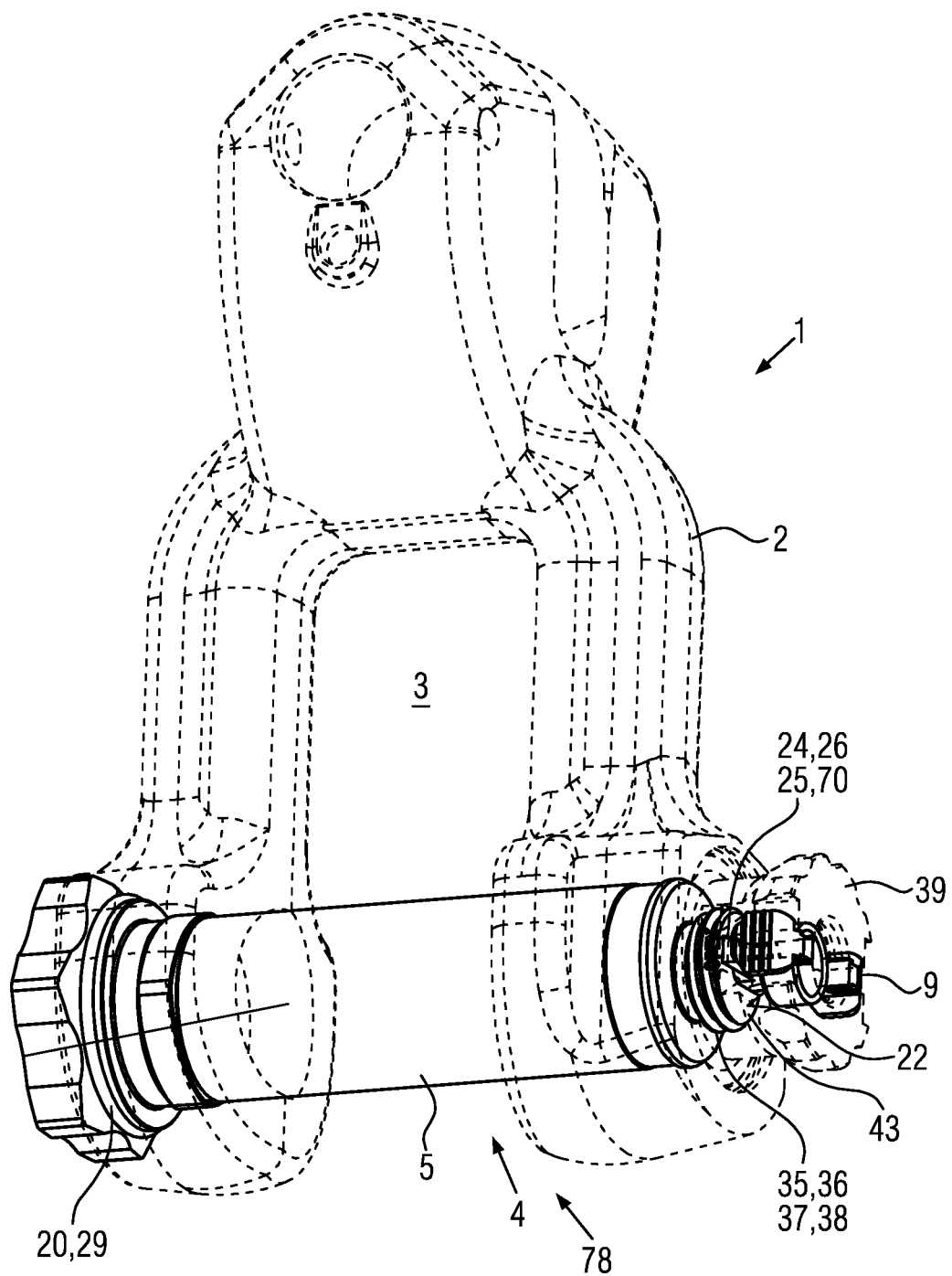
FIG. 11 shows the embodiment according to FIG. 10 in a schematic perspective view of the closing position.
Figure 12:
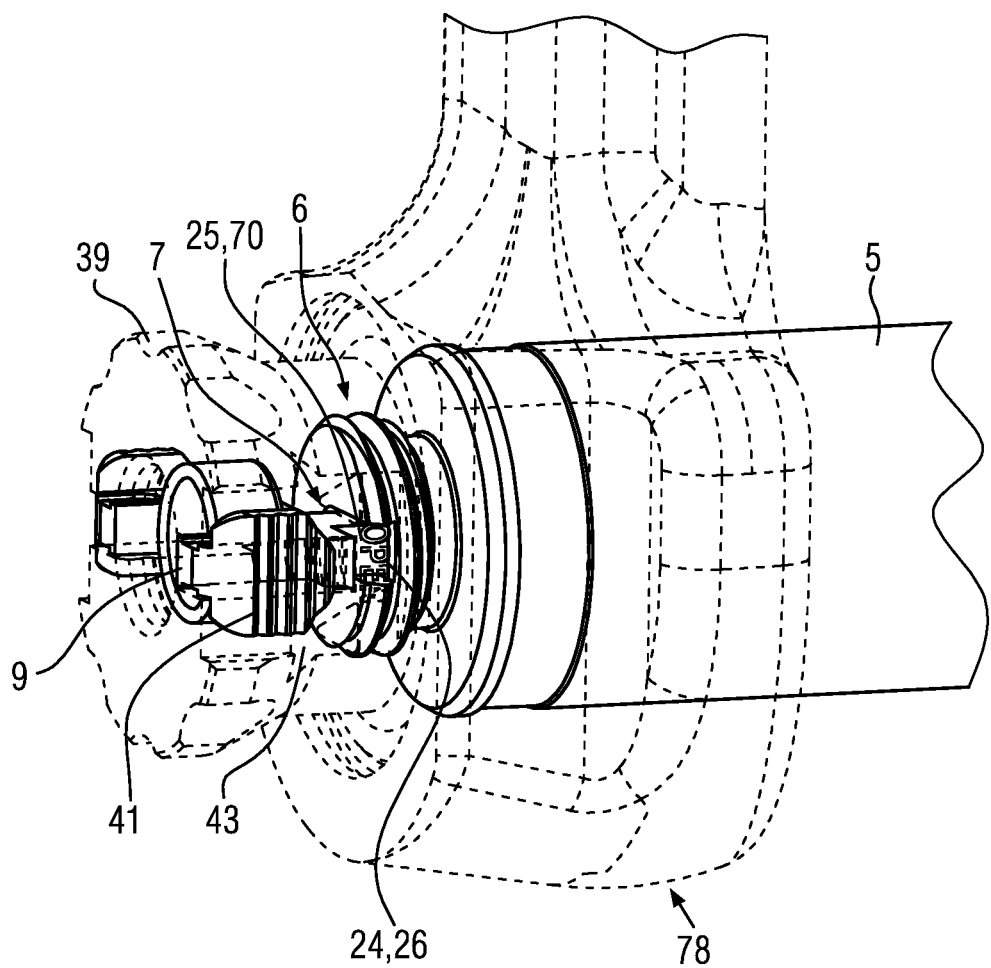
FIG. 12 shows a detail of FIG. 11.

A further embodiment of a component 1 according to the present invention is shown in FIGS. 10 to 12. This embodiment differs from the above-mentioned embodiment insofar as the indicator element 20 is arranged not on the side of the reception means 39 or of the closure 6 or of the closure lock 7, but on the end of the closing element 5 facing away from the closure element 35, in the present case e.g. on a circumferential surface in the area of the head 65. The indicator element 20 is a distinctly colored, preferably annular mark 29, which is located preferably directly below the head 65 and which is visible until the closing element 5 has been fully inserted in the passage opening 13 and the closing position 78 (FIG. 11, 12) has consequently been reached. The mark 29 will, in such a case, e.g. be red, so as to indicate to the user a dangerous condition as long as the mark can be seen. This embodiment of an indicator element can be combined with the embodiment of the indicator element of the preceding embodiment, so as to indicate both the non-assumed closing position 78 and the closing position 78 in a manner visible from outside.

Other than in the case of the preceding embodiment, the reception means 39 is cap-shaped in the case of this embodiment, and the grip element 9 does not define a closure lid, but the reception means 39 itself closes at least a part of the passage opening 14 and the extension of the latter in the form of the interior 43 of the reception means 39.

The recess 26 is not sector-shaped but slot-shaped and the locking projection 70 is rib-shaped. As for the rest, the function and the structural design of component 1 correspond to those of the preceding embodiment.

Instead of the hitherto shown variant, where the grip element 9 is placed into the reception means 39 from the outer side of the reception means 39, the grip element 9 may, by the way, also be inserted from the other side of the reception means 39, which faces the main body 2. In such a case, the reception means 39 can be closed completely, and this leads to a better encapsulation of the interior 43.

Figure 13:
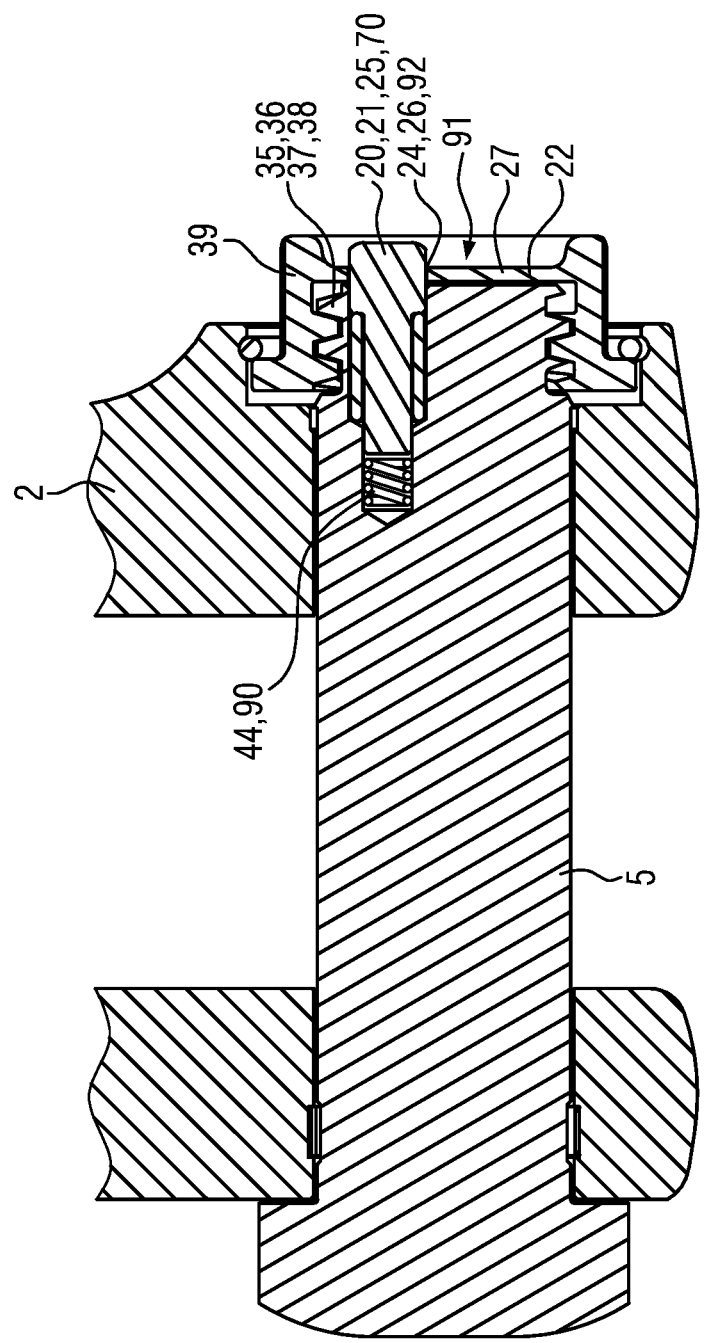
FIG. 13 shows a further embodiment of the present invention in a schematic view of the closing position.

In FIG. 13, a third embodiment of a component 1 according to the present invention is shown. In the case of this embodiment, the indicator element 20 is accommodated in the closing element 5 such that it is movable, preferably movable under the load of a spring. A pin 21 is pressed out of the end face 22 by a spring 90. The indicator element 20 simultaneously serves as a locking element 25, insofar as it defines a spring-loaded locking projection, which lockingly engages a recess on the side of the reception means as soon as the closing position has been reached. To this end, the reception means 39 is provided with a lid-shaped detent plate 91, in the case of which the locking element 25 is located from an opening at a predetermined angular position relative to the thread start.

The detent plate 91 serves simultaneously as the cover member 27, which prevents the indicator element 20 from being seen from outside as long as the closing position 78 has not been reached.

During turning-in of the thread before the closing position is reached, the indicator element 20 is first again spaced apart from the reception means 39 during the first relative rotation between the closing element 5 and the reception means 39. Only shortly after the first rotation, when the indicator element 20 has been moved past the recess of the detent plate 91, the indicator element 20 will rest on the detent plate 91. As the turning-in of the closing element 5 continues, the indicator element 20 is forced into the closing element 5 against the effect of the spring 90, until it will reach the opening 92 and automatically project through the opening under the action of the spring 90. The closure lock 7 has now been activated and the indicator element 20 can be seen from outside. It follows that the indicator element 20 also constitutes the locking element 25 and the locking projection 70, respectively, which lockingly engages the opening 92 used as a locking element 24 and a recess 26.

For releasing the closure lock 7, the indicator element 20 is forced inwards and the closing element 5 is turned out of the reception means 39.

Figure 14:
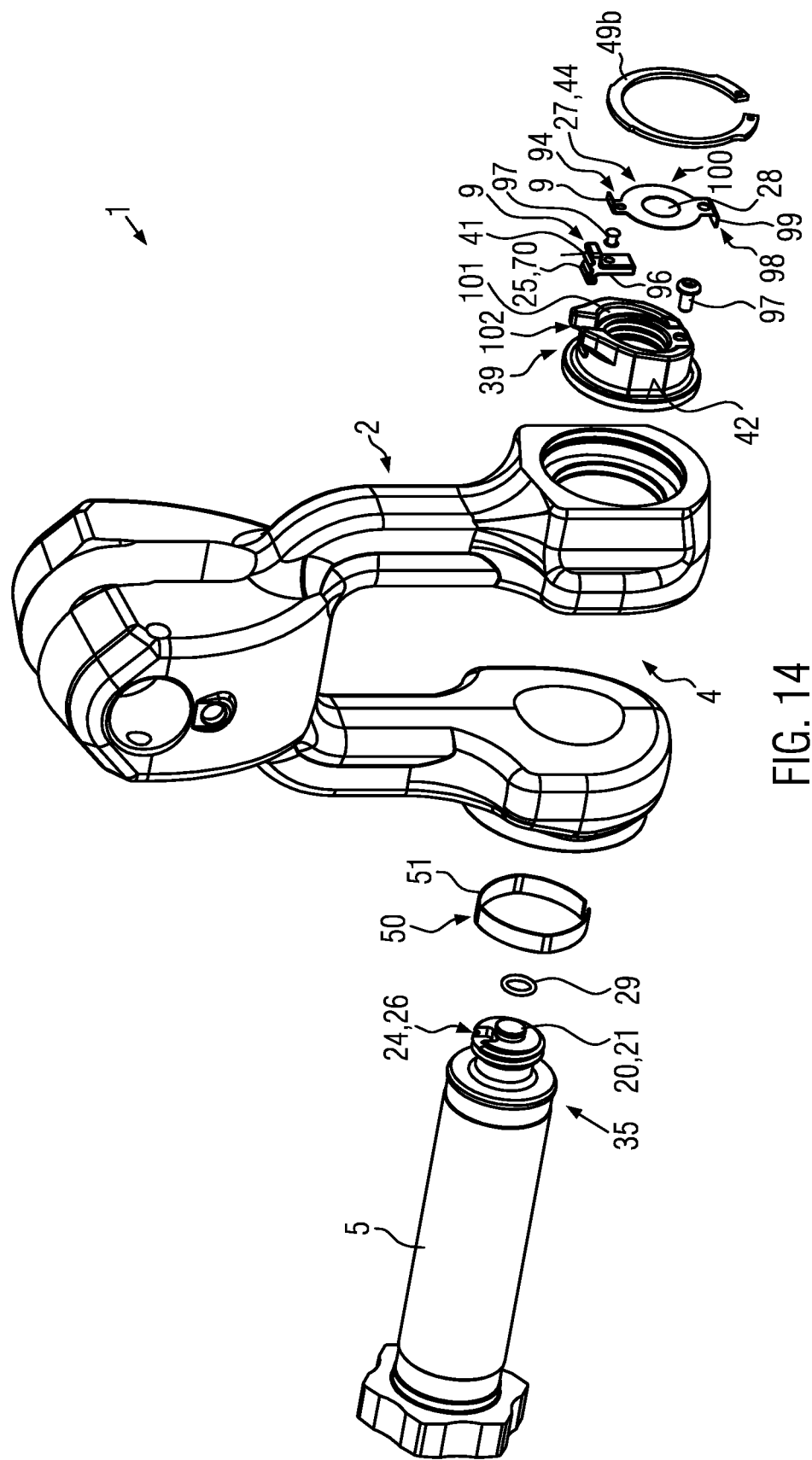
FIG. 14 shows a further embodiment of the present invention in a schematic, perspective exploded view.
Figure 15:
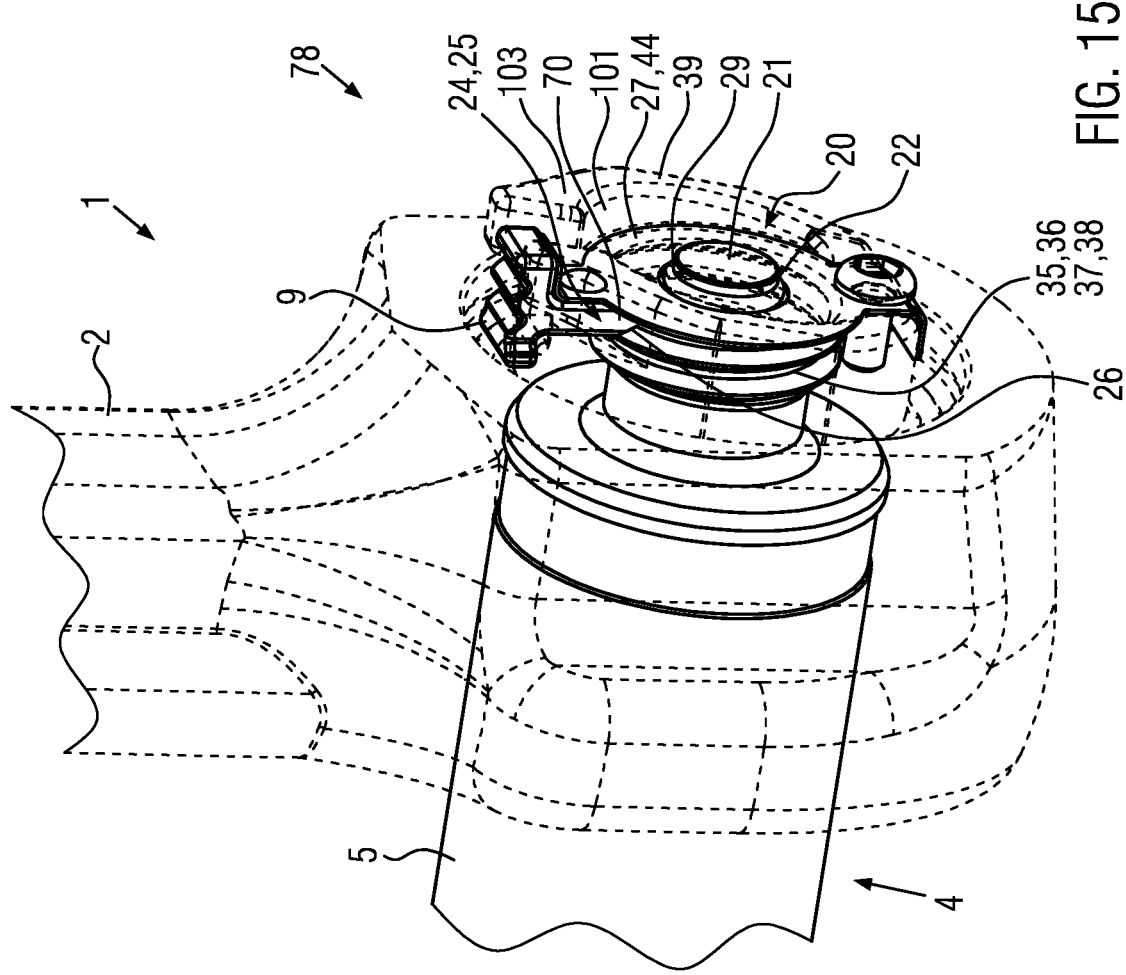
FIG. 15 shows a detail of the embodiment according to FIG. 14 in a schematic perspective view.

FIGS. 14 and 15 show a further embodiment of a component 1 according to the present invention.

The structural design of the closing element 5 corresponds substantially to the structural design of the embodiment according to FIG. 1. Other than in the case of this embodiment, the recess 26 serving as a locking element 24 is not provided with a pie-shaped or triangular base area, but with a rectangular base area, in the embodiment according to FIGS. 14 and 15

Furthermore, the mark 29 is configured as a colored ring in the embodiment according to FIGS. 14 and 15, said colored ring being placed in a respective groove 93 of the indicator element 20, which is here again configured as a pin 21. The mark 29 may e.g. be a colored rubber or plastic ring.

A further difference between the embodiment according to FIG. 14 and the preceding embodiments is to be seen in that the functions of the retaining spring 44 and of the grip element 9 are now united in a common component. To this end, the retaining spring 44 is configured as a leaf spring having secured thereto a portion 94, which has here the shape of a small plate and which serves as a grip element 9. The portion 94 projects laterally beyond the reception means 39, so that it can be gripped by hand and deflected. The portion 94 is defined by a part 96, which serves simultaneously as locking element 25 and locking projection 70. The retaining spring 44 made be produced as a stamped bent part from a metal sheet, e.g. from a spring steel sheet. The part 96 may be secured to the retaining spring by means of a fastening element 97, e.g. a rivet or a screw. The part 96 may also be welded, soldered and/or clamped in position in the pocket 95. The connection, which is shown only exemplarily, is a form-fit connection.

The retaining spring 44 is secured to a fastening point 98 on the reception means 39 in a deflectable manner. Also this fastening can take place via fastening elements, such as a screw or a rivet and/or connections created by a material bond or form-fit connections. The fastening point 98 may be formed in a further lug 99, which is bent in particular onto the circumferential surface 42 of the reception means 39. The lug 99 may be arranged in opposed relationship with the lug 94.

In addition, the retaining spring 44 may simultaneously serve as a cover member 27, which, like in the case of the preceding embodiments, covers the mark 29 until the closing position 78 shown in FIG. 15 has been reached.

To this end, the retaining spring 44 may have an opening 28 through which the mark 29 is passed on its way from the open to the closed position. The opening 28 may be formed in an annular or disk-shaped central portion 100 of the retaining spring 44. The central portion 100 is adapted to be inserted into the reception means 39 from the reception means side located opposite the passage 4.

The reception means 39 may be provided with a collar 101 for protecting the retaining spring 44, which, accessible from outside, closes the reception means 39 on the side facing away from the passage 4. The collar includes at least one opening 102 through which the grip element 9 projects beyond the circumferential surface 42 of the reception means 39.

An end face of the collar 101 is preferably chamfered, so that it increases in height towards the location of the retaining spring 44 displaced farthest when the grip element 9 is being operated. In the embodiment according to FIGS. 14 and 15, this location corresponds to the position of the grip element 9. Due to the increasing height of the collar, the retaining spring 44 will remain protected even if it is deflected.

At the closing position 78 shown in FIG. 15, the part 96 projects into the recess 26 and secures the closure 6 in position. For releasing the closure lock, the retaining spring 44 is deflected by moving the grip element 9 away from the passage opening 4 until the part 96 releases the recess 26.

In order to prevent the retaining spring 44 from being excessively deflected when the closure lock is being released or during operation at the closing position, whereupon it may plastically deform, wear or break, a stop 103 is provided in the area of the recess 102. The stop 103 limits the deflectability of the grip element 9. The stop 103 may be provided e.g. in the form of an indentation (German term "Abdruckung") on the end of the recess 102 facing away from the main body 2 and prevent the grip element 9 from being moved out of the reception means 39.

For reliably closing the passage 4, the closing bolt is first screwed into the reception means 39, like in the case of the preceding embodiments. The external and internal threads 37, 38 are provided with thread starts, whose respective position is predetermined relative to the position of the locking elements 24, 25, just as in the case of the other embodiments. Thus, it can be guaranteed that the closure lock 7 will only be activated when a certain screw-in depth has been reached.

Before the part 96 snaps in position into the recess 26 and secures the closure 6, the retaining spring 44 is pushed away from the reception means 39 by the end face of the closing element 5, so that it will cover the mark 29. Only when the form-fit engagement of the closure lock 7 has been established and the retaining spring 44 abuts on the end face 22 of the closing element 5, i.e. when the closing position 78 has been reliably reached, the retaining spring 44 will allow the mark 29 to be seen.

Further variants of component 1 are possible. For example, instead of an axial orientation of the indicator element 20, which serves simultaneously as a locking element of the closure lock 7, a radial orientation may be chosen, insofar as the opening 92 is then provided on the circumferential surface 42 of the reception means 39 and the indicator element 20 is accommodated in a radial bore of the closing element 5.

If, in the case of the above described structural designs, it is not of importance that the closing element 5 is rotatably supported at the closing position, the reception means 39 may always also be rigidly connected to the main body 2, e.g. by welding, or monolithically integrated in the main body 2. When this structural design is chosen, it should be ensured that the closure 6 and the closure lock 7 provide a sufficient amount of radial play, so that, when a load is applied to the closing element 5, they will remain force-free insofar as the closing element 5 is supported in the passage openings 13 or 14.

Figure 16:
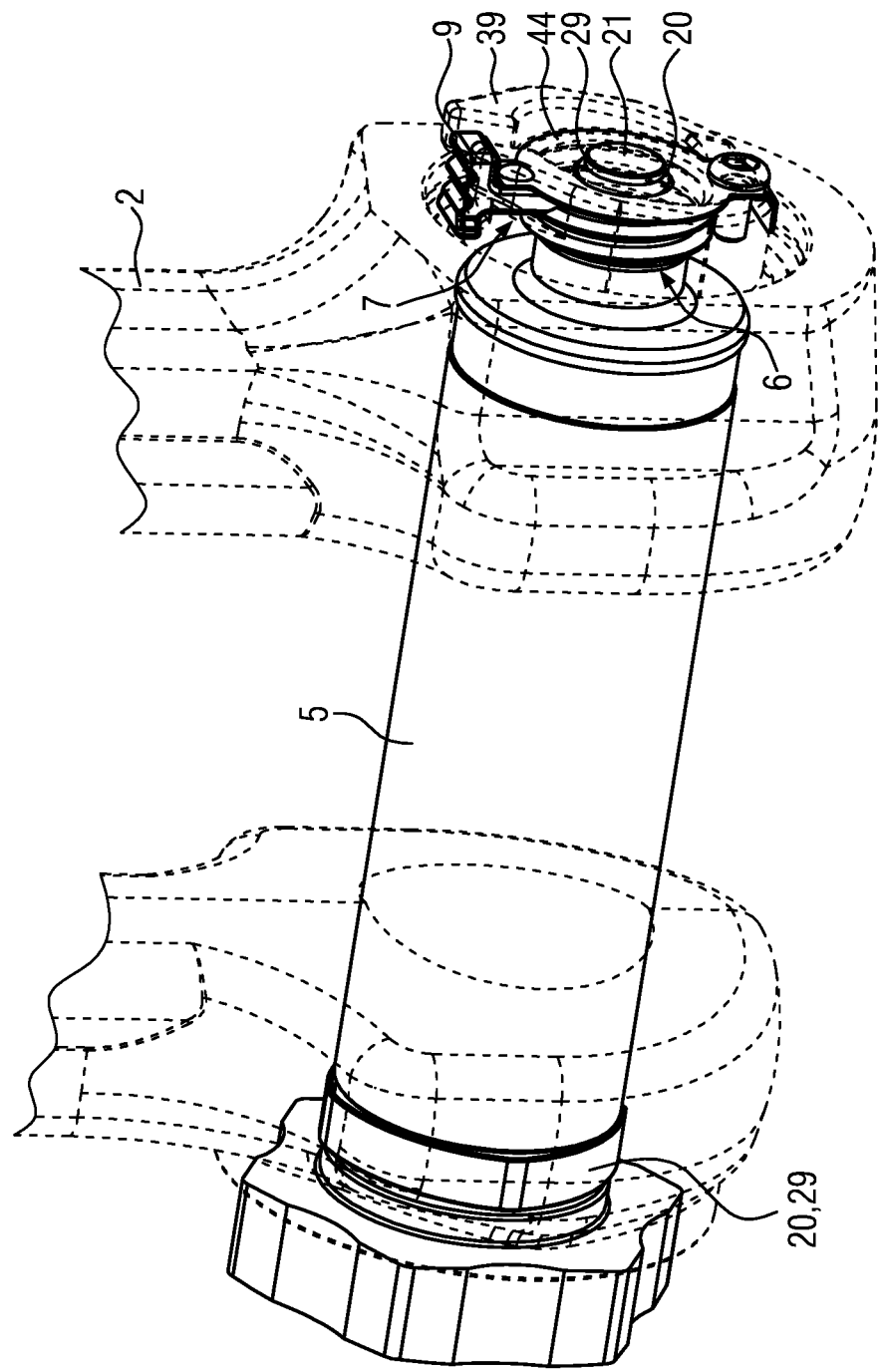
FIG. 16 shows a further embodiment of a component for lifting, lashing or stop technology.

FIG. 16 shows such a rigid variant of component 1 based on the embodiment according to FIGS. 15 and 16.

REFERENCE NUMERALS 1 component
2 main body
3 opening
4 passage
5 closing element
6 closure
7 closure lock
8 torsional and rotational forces, respectively
9 grip element
10 side pieces
11, 12 opposed sides of the opening
13, 14 passage openings
20 indicator element
21 pin
22 end face
23 longitudinal axis of the closing element
24, 25 locking elements
26 recess
27 cover member
28 opening of the cover member
29 mark
30 separate sleeve
35, 36 closure elements
37 external thread
38 internal thread
39 reception means
40 form-fit elements
41 handling areas
42 circumferential surface of the reception means
43 interior of the reception means
44 retaining spring
45 slots
46 arms
47 pass-through direction
48 support ring
49a, 49b retaining rings
50 safety catch
51 annular spring
52 annular collar
53 groove
54 distance between the end of the closing element and the groove
55 end of the closing element
60 closing bolt
61 area of the closing element
62 outer diameter of the external thread
63 body of the closing element
64 other end of the closing element
65 head
66 form-fit/gripping elements on the head
67 circumferential surface of the closure element
70 locking projection
71 height of the locking projection
75 open position
76 annular bead
77 height
78 closing position
80 additional groove
81 support surfaces of the passage openings
90 spring for indicator element
91 detent plate
92 opening
93 groove in the indicator element
94 lug-shaped portion
96 part for forming a locking projection
97 fastening element
98 fastening point
99 additional lug
100 central portion
101 collar
102 recess of the collar
103 stop

The invention claimed is:

1. A component for lifting, lashing or stop technology for outdoor or offshore applications, comprising an opening defined by a main body and having at least one closable passage further comprising a closing element by means of which the passage is closed at a closing position, a closure through which the closing element is held at the closing position such that it is rotatable relative to the main body and secured against opening of the passage, and a closure lock, which is automatically activated at the closing position and through which the closure is blocked at the closing position, said closure lock comprising a grip element used for releasing the closure lock and configured for operation by hand without the use of a tool.

2. The component for lifting, lashing or stop technology according to claim 1, wherein there is/are provided an indicator element, which is visible from outside a component in an activated condition of the closure lock and concealed in the non-activated condition of the closure lock, and/or an indicator element, which is visible from outside the component in the non-activated condition of the closure lock and which is arranged such that it is concealed in the activated condition of the closure lock.

3. The component for lifting, lashing or stop technology according to claim 2, wherein the closure lock comprises two locking elements, which enter into locking engagement with one another, and the indicator element is connected to one of the locking elements in a motion-transmitting manner.

4. The component for lifting, lashing or stop technology according to claim 3, wherein the indicator element is connected to one of the locking elements via a material bond.

5. The component for lifting, lashing or stop technology according to claim 4, wherein a cover member is provided, which is movable relative to the indicator element to a position where it covers the indicator element, said cover member being connected to one of the locking elements in a motion-transmitting manner.

6. The component for lifting, lashing or stop technology according to claim 3, wherein a cover member is provided, which is movable relative to the indicator element to a position where it covers the indicator element, said cover member being connected to one of the locking elements in a motion-transmitting manner.

7. The component for lifting, lashing or stop technology according to claim 6, wherein the indicator element and the cover member are adapted to be rotated relative to the main body at the closing position.

8. The component for lifting, lashing or stop technology according to claim 2, wherein a cover member is provided, which is movable relative to the indicator element to a position where it covers the indicator element, said cover member being connected to one of the locking elements in a motion-transmitting manner.

9. The component for lifting, lashing or stop technology according to claim 8, wherein the cover member is connected to one of the locking elements via a material bond.

10. The component for lifting, lashing or stop technology according to claim 8, wherein the indicator element and the cover member are adapted to be rotated relative to the main body at the closing position.

11. The component for lifting, lashing or stop technology according to claim 1, wherein the closure comprises closure elements on the closing element, which are adapted to rotatably enter into engagement with one another, and a reception means for the closing element, said reception means being rotatably supported on the main body.

12. The component for lifting, lashing or stop technology according to claim 11, wherein the reception means is configured in the shape of a nut.

13. The component for lifting, lashing or stop technology according to claim 11, wherein the grip element is supported in the reception means such that it is movable relative thereto.

14. The component for lifting, lashing or stop technology according to claim 1, wherein the grip element is supported such that it is rotatable relative to the main body.

15. The component for lifting, lashing or stop technology according to claim 1, wherein the grip element and a retaining spring of the closure lock are monolithically united.

16. The component for lifting, lashing or stop technology according to claim 1, wherein the closure lock activates itself automatically only at a predetermined position of the closure.

17. The component for lifting, lashing or stop technology according to claim 1, wherein the closure is configured such that it is operable by a rotational movement and the closure lock is configured such that it is releasable in a direction perpendicular to this rotational movement.

18. The component for lifting, lashing or stop technology according to claim 1, wherein a safety catch is provided, by means of which the closing element is secured in position on the main body in the open condition of the passage.

* * * * *